United States Patent
Hunt (10) Patent No.: US 11,260,918 B2
(45) Date of Patent: Mar. 1, 2022

(54) SYSTEM FOR A VEHICLE SHELL

(71) Applicant: Armadillo Designs, San Luis Obispo, CA (US)

(72) Inventor: Samuel David Hunt, Santa Rosa, CA (US)

(73) Assignee: ARMADILLO DESIGNS, San Luis Obispo, CA (US)

( * ) Notice: Subject to any disclaimer, the term of this patent is extended or adjusted under 35 U.S.C. 154(b) by 0 days.

(21) Appl. No.: 17/354,916

(22) Filed: Jun. 22, 2021

(65) Prior Publication Data

US 2021/0394835 A1     Dec. 23, 2021

Related U.S. Application Data

(60) Provisional application No. 63/042,090, filed on Jun. 22, 2020.

(51) Int. Cl.
*B62D 33/04* (2006.01)
*B62D 65/16* (2006.01)

(52) U.S. Cl.
CPC ............. *B62D 33/04* (2013.01); *B62D 65/16* (2013.01)

(58) Field of Classification Search
CPC ................................ B62D 33/04; B62D 65/16
See application file for complete search history.

(56) References Cited

U.S. PATENT DOCUMENTS

| | | |
|---|---|---|
| 3,995,890 A | 12/1976 | Fletcher |
| 4,943,108 A | 7/1990 | Turnbull |
| 5,013,078 A | 5/1991 | Eckerd et al. |
| 5,016,935 A | 5/1991 | Semple |
| 5,104,175 A | 4/1992 | Enninga |
| 5,209,543 A | 5/1993 | Harkins, Jr. |
| 5,423,587 A | 6/1995 | Ingram |
| 5,531,497 A | 7/1996 | Cheng |
| 5,628,540 A | 5/1997 | James |
| 5,951,095 A | 9/1999 | Herndon |
| 6,000,745 A | 12/1999 | Alexa |
| 6,176,541 B1 | 1/2001 | Hoff |
| 6,309,006 B1 | 10/2001 | Rippberger |
| 6,505,878 B1 | 1/2003 | Mascolo |
| 6,641,201 B1 | 11/2003 | Pietryga et al. |

(Continued)

OTHER PUBLICATIONS

International Search Report and Written Opinion for PCT/US2021/38518 dated Sep. 24, 2021, 8 pages.

*Primary Examiner* — D Glenn Dayoan
*Assistant Examiner* — Melissa Ann Bonifazi
(74) *Attorney, Agent, or Firm* — Jennifer Hayes; Nixon Peabody LLP (57) ABSTRACT

Systems and methods are provided for a vehicle bed shell. The system includes a pair of sidewalls with each including a top portion and two horizontal railings. The sidewalls are coupled to parallel sides of a bed of a vehicle. The system also includes at least one cross beam coupled perpendicularly to each of the horizontal railings of the sidewalls configured to stabilize each sidewall. The system also includes a plurality of cylindrical inserts, including a bottom. The system also includes a hinge element, with a sleeve, one or more hinge plates, and a vertical railing. The hinge element is coupled to a back side of each of the sidewalls, and the sleeve and the one or more hinge plates are configured to slide along the vertical railing. The system also includes a back wall that is coupled to at least one of the sidewalls via the hinge element.

20 Claims, 7 Drawing Sheets

(56) References Cited

U.S. PATENT DOCUMENTS

| | | |
|---|---|---|
| 6,712,418 B1 | 3/2004 | Lathers |
| 6,767,043 B1 | 7/2004 | Sanseviero |
| 6,799,787 B2 | 10/2004 | Angelos |
| 7,131,684 B1 | 11/2006 | Goodling |
| 7,147,265 B1 | 12/2006 | Schmeichel |
| 7,243,965 B2 | 7/2007 | King et al. |
| 7,261,362 B1 | 8/2007 | Mendez |
| 7,404,586 B2 | 7/2008 | Seiberling |
| 7,914,064 B2 | 3/2011 | Joab |
| 7,914,614 B1 | 3/2011 | Lukacs |
| 7,988,218 B1 | 8/2011 | Devine |
| 9,403,424 B2 | 8/2016 | Cortez |
| 9,975,501 B1 | 5/2018 | Frederick et al. |
| 10,046,628 B1 | 8/2018 | Fulton |

100 # SYSTEM FOR A VEHICLE SHELL

CROSS-REFERENCE TO RELATED APPLICATIONS

This application claims priority from and benefit of U.S. Provisional Patent Application Ser. No. 63/042,090, filed on Jun. 22, 2020 titled "SYSTEM FOR A VEHICLE SHELL," which is hereby incorporated by reference in its entirety.

FIELD OF THE INVENTION

The present invention relates to components for vehicle shells. More specifically, the present disclosure relates to components for truck shells with a convertible roof.

BACKGROUND

Transporting items from one place to another in the bed of vehicle is a convenient form of transportation. These items may include anything that can be transported, such as tools, building materials, furniture, animals/livestock, other transportation devices, and the like. However, often times the items are of such a large size that the item or items do not properly fit within the bounds of the bed of the vehicle or may be difficult to secure when loaded to the bed of a vehicle. Further, a common issue is that the items are exposed to the elements, which can cause undesired effects, such as damage, corrosion, extra wear, destruction, or loss/theft.

Current solutions in existence today have a fixed roof system, creating an obstruction for the user to have to bend down or crawl to access items in the bed of the vehicle. Furthermore, a fixed roof system limits the height of the items being loaded into the vehicle because the items must fit underneath the top of the fixed roof system. Another solution includes tool boxes and tonneau covers to make items more accessible to the user but is not an enclosed space.

Thus, there exists a need for a device that allows for items in the bed of a vehicle to be stored in a manner where they are protected from the elements, can vary in height, and that is accessible to a user.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

The present application is focused on a truck shell adapted for a convertible roof. The shell may be installed over the bed of a pickup truck and will have a rigid frame supporting the shell's convertible roof. The frame may have sidewalls that can hinge open, toolboxes that are installed, or have roll doors that revolve around a fitted cylinder.

The frame allows for the sidewalls, doors, and convertible roof to be supported and utilized to provide a truck shell that may be water-tight and is secure.

Additionally, the frame is constructed to allow different rack attachments.

The frame may be made of steel or aluminum or chromoly metal. The frame is a fixed size once assembled, but has the ability to be manufactured for different truck be sizes. The frame may be configured to allow for different retractable (e.g. "tonneau") covers to be installed. The retractable covers may be installed on rails on both sides of the frame, and the cover may have feet, rollers, or other components to slide along the rails.

The frame may be designed to allow for walls to be installed, which fully enclose the shell and may create a water tight and secure enclosure. This may include two sidewalls on the left and right side of the vehicle and frame and a back wall at the rear of the vehicle.

The system may include a hinging mechanism for a back wall of the frame at the rear of a vehicle on which it is installed. In some examples, the hinge system may consist of a vertical railing that is mounted off of the frame. In some examples, a back wall is connected to the vertical railing, so that the back wall may be opened by rotating the vertical railing.

The railing may have hinge plates installed on it, which are concentric with the railing that connect to the back wall.

In some examples, hinge mechanism may include a slide that sits above or below one of the hinge plates. Accordingly, a spring or other mechanism may bias the sleeve towards the hinge plate. The hinge plate may have teeth or other components that may engage the sleeve once the back wall is swung open a certain angle. This will hold the back wall open. Accordingly, to close the back wall, the sleeve would need to be slid op or down, to disengage the teeth on the hinge plate, so that the back wall could be swung closed.

The system may also have cylindrical inserts on the top of the frame configured to connect to different commercially available rack systems that can be installed on the frame. In some examples, commercially available have mounting posts that lie concentric and within the cylindrical inserts. In other examples, the inserts may have different geometric, should as square, rectangular or others. The circular shape of the inserts and mounting posts allow for easy installation and removal.

Additionally, the rack may lock to the frame with clamping mechanisms on the rack systems within the inserts or via a pin locking mechanism in the inserts. The cylindrical inserts allow the rack systems to be installed on top of the frame of the sale without the need for tools in some examples. In some examples, the inserts may allow certain rack systems (such as the cross bars) to pivot, because they are circular. Accordingly, users may be able to pivot the rack system out of the way, in the case of loading all objects or when desired.

The vertical rails may also mount to the top of the cylindrical inserts. For instance, the top outer edge of the cylindrical inserts may be fit with splines, a key or a D shape, which will support the vertical railings and keep them fixed at exact positions.

The following presents a simplified summary of one or more embodiments in order to provide a basic understanding of present technology. This summary is not an extensive overview of all contemplated embodiments of the present technology, and is intended to neither identify key or critical elements of all examples, nor delineate the scope of any or all aspects of the present technology. Its sole purpose is to present some concepts of one or more examples in a simplified form as a prelude to the more detailed description that is presented later.

Embodiments of the disclosure concern a system for a shell used on the bed of a vehicle. The system includes a pair of sidewalls with each including a top portion and two horizontal railings. The sidewalls are coupled to parallel sides of a bed of a vehicle with each horizontal railing coupled to the top portion of the sidewalls. The system also includes a pair of cross beams coupled perpendicularly to each top portion of the sidewalls configured to stabilize each sidewall. The system also includes a plurality of cylindrical inserts, including a bottom. The bottom of each of the plurality of cylindrical inserts is coupled to each of the horizontal railings of the pair of sidewalls, and each of the plurality of cylindrical inserts is configured to attach one or more structures to each of the sidewalls. The system also includes a hinge element, with a sleeve, one or more hinge plates, and a vertical railing. The hinge element is coupled to a back side of each of the sidewalls, and the sleeve and the one or more hinge plates are configured to slide along the vertical railing. A bottom side of the sleeve has one or more sets of protrusions that match one or more sets of protrusions on a top side of the one or more hinge plates.

Embodiments of the disclosure concern a system for a shell used on the bed of a vehicle including a back wall. The system includes a pair of sidewalls with each including a top portion and two horizontal railings. The sidewalls are coupled to parallel sides of a bed of a vehicle with each horizontal railing coupled to the top portion of the sidewalls. The system also includes at least one cross beam coupled perpendicularly to each top portion of the sidewalls configured to stabilize each sidewall. The system also includes a plurality of cylindrical inserts, including a bottom. The bottom of each of the plurality of cylindrical inserts is coupled to each of the horizontal railings of the pair of sidewalls, and each of the plurality of cylindrical inserts is configured to attach one or more structures to each of the sidewalls. The system also includes a hinge element, with a sleeve, one or more hinge plates, and a vertical railing. The hinge element is coupled to a back side of each of the sidewalls, and the sleeve and the one or more hinge plates are configured to slide along the vertical railing. A bottom side of the sleeve has one or more sets of protrusions that match one or more sets of protrusions on a top side of the one or more hinge plates. The system also includes a back wall that is coupled to at least one of the sidewalls via the hinge element.

Embodiments of the disclosure concern a method for assembling a shell used on the bed of a vehicle including a back wall. The method includes attaching a pair of sidewalls to parallel sides of a bed of a vehicle with each sidewall including a top portion and two horizontal railings. The horizontal railings are coupled to the top portion of the sidewalls. The method also includes perpendicularly attaching at least one cross beam to each top portion of the sidewalls configured to stabilize each sidewall. The method also includes connecting a plurality of cylindrical inserts to each of the horizontal railings of the pair of sidewalls. Each of the plurality of cylindrical inserts are configured to attach one or more structures to each of the sidewalls. The method also includes connecting a hinge element to a back side of each of the sidewalls. The hinge element including a sleeve, one or more hinge plates, and a vertical railing. The sleeve and the one or more hinge plates are moveably configured to slide along the vertical railing. A bottom side of the sleeve has one or more sets of protrusions matching one or more sets of protrusions on a top side of the one or more hinge plates. The method also includes attaching a back wall that is movably coupled to at least one of the sidewalls via the hinge element.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Overview

As disclosed herein, storing items in the bed of vehicle has difficulties such as keeping the items safe while they remain in a stationary or moving vehicle, properly securing the items in a stationary or moving vehicle, and ensuring weather elements to not damage or cause undesired effects on the items. As a result, items stored and/or transported in the bed of a vehicle may be damaged if the vehicle is driven and the items are not properly secured or if the items are left exposed to others without supervision or exposed to weather conditions. This may result in more trips or may require a different vehicle. Thus, the present disclosure is directed to systems and methods that can (i) allow for safe storage and accessibility of items in the bed of a vehicle, (ii) allow for more variety of shapes and sizes of items to be transported in the bed of a vehicle, and/or (iii) reduce the number of trips required to transport a load. The disclosed systems and methods not only save time, but also reduce potential damage to items transported or stored in the bed of a vehicle.

Figure 1:
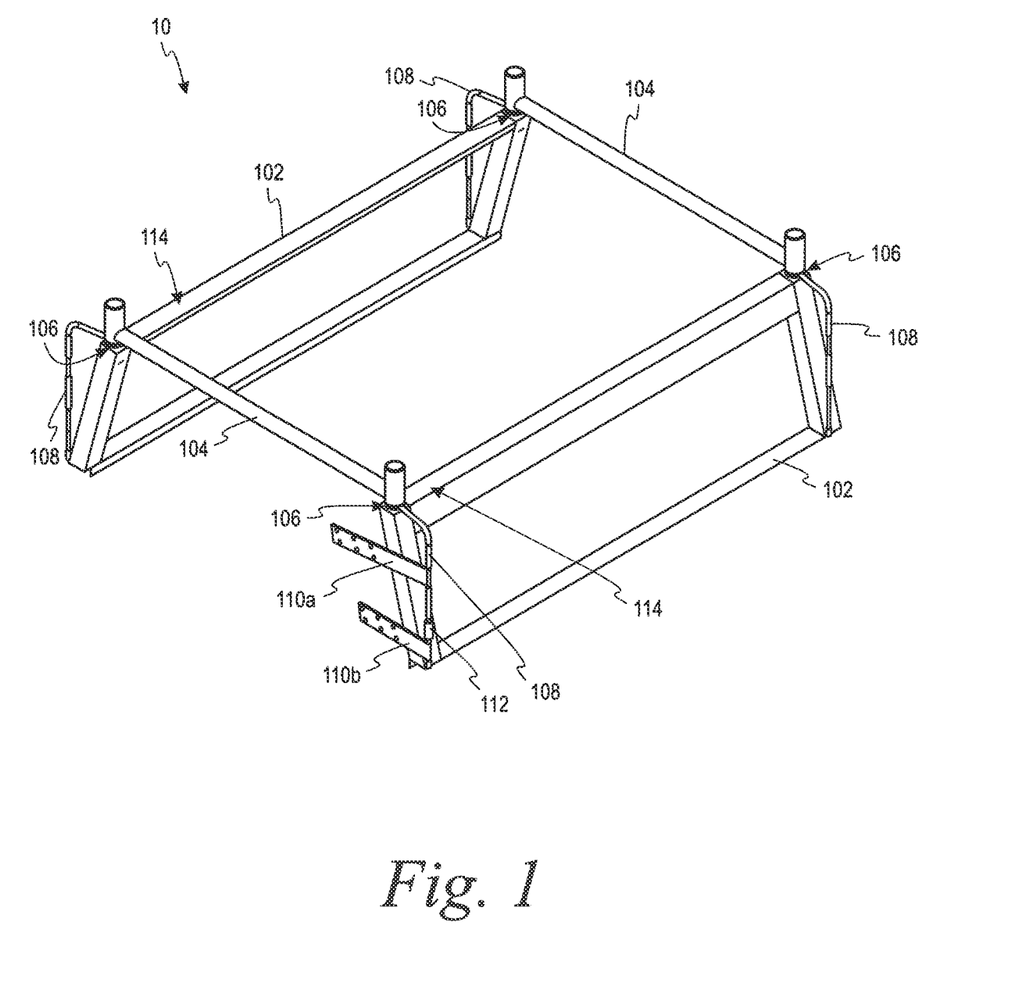
FIG. 1 illustrates a perspective view of a system for a vehicle shell according to an embodiment.

According to some implementations of the present disclosure, FIG. 1 illustrates a system 10 for a shell used on the bed of a vehicle. In some implementations, the system 10 can provide a user with an assembly that assists in storing and transporting items in the bed of a vehicle. In some implementations, the system 10 also allows for a variety of items with different shapes and sizes, including but not limited to items such as leisurely equipment, furniture, tools, that may not regularly fit in and be properly secured to the bed of a vehicle, allowing for more storage space. Additionally, the user of system 10 may have alleviated back and knee pain from having easier access to their items. In some implementations, the system 10 also acts to reduce or minimize weather conditions exposed to items in the bed of a vehicle. In some implementations, the user of the system 10 may have their own vehicle for leisurely use or may be using their own or an entity's vehicle for work-related use. In some implementations, the system 10 may be adjusted to properly fit each type of vehicle beds prior to assembly. Thus, the system 10 may have a modular design. In some implementations, the system 10 includes components that allow for additional items to be stored or transported on the system 10 itself, other than resting or being supported by the bed of the vehicle.

Thus, the system 10 allows a user to easily load a vehicle with secured items according to the size of the bed and customize the types of connections used. In some implementations, transporting items using parts of the vehicle other than the bed may also be used. For example, a cylindrical insert 106 of the system 10 may allow for another storage or transportation method. Thus, additional items such as bikes, surf boards, kayaks, or lumber may be stored or transported using system 10.

FIG. 1 illustrates a perspective view of a system as disclosed herein. The system 10 includes a pair of sidewalls 102, each with cover railings 114, a pair of cross beams 104, a plurality of inserts 106, one or more hinge plates 110a, 110b, a railing 108, and a sleeve 112. In this implementation, the parts in the system 10 are fabricated from aluminum. In other implementations, the parts in the system 10 may be fabricated from chromoyl metal, steel, magnesium, titanium, or other lightweight metal strong enough to at least support a commercial-grade rack and maintain structural integrity as a vehicle shell. Furthermore, the size of the system 10 may be customized to fit the size of different vehicle beds. Thus, the system 10 is versatile and adjustable in size.

The system 10 may be attached to a bed of a vehicle (e.g. a pickup truck). For instance, the sidewalls 102 may be attached to the left and right walls of the bed of a truck. The sidewalls 102 may include windows or other features, and may be a full panel that can be water tight. The sidewalls 102 may attach to the top of the bed of the truck by various mechanisms known in the art. The sidewalls 102 may each have a cover railing 114 attached along a top portion of the sidewall 102 and running horizontally to allow a cover 208, such as a convertible roof, to be retracted and advanced to open and close a space or opening created by the sidewalls 102 and back wall. For instance, the cover railings 114 may allow pegs, rollers, pins, or other mechanisms on the sides of the cover 208 to slide along the cover railings 114. In some examples, the railings 114 may have a channel to allow the peg from the cover 208 to slide along. In some examples, the channel may be different sizes to accommodate different types of covers 208.

In some examples, the sidewalls 102 may include spaces at the top corners that are configured so that inserts 106 may be connected to the spaces. For instance, the spaces may be cylindrical, and allow for cylindrical inserts 106 to be inserted into the spaces. The inserts 106 may be cylindrical on a bottom side and a different shape on a top side to accommodate different attachments.

Additionally, the system may include one or more railings 108 that include a circular portion to place over the inserts 106. The railings 108 may then be connected to the frame, and may be vertical or nearly vertical. As illustrated there may be a railing 108 connected to each of the top four corners of the sidewalls 102 and inserted into a hole at the bottom of the sidewalls 102 to stabilize the railing 108.

One of the railings 108 near the back of the system may include hinge plates 110a and 110b, that connect to a back wall. The railing 108 and hinge plate combination allow the back wall to be swung open using the railing 108 as a stationary axis, that is primarily vertically situated.

The system 10 may include one or more cross beams 104 that are relatively horizontal and connect the left and right sideways by fitting over the inserts 106. The cross beams 104 may include cylindrical portions at the ends that may be attached to a commercial rack, in some embodiments. In other examples, different shaped ends that are compatible with different racks may be incorporated into the cross beams. In other examples, additional cross beams may be attached to the left and right sidewalls 102 for additional support.

Therefore, the system 10 may provide the foundation for a durable truck shell that is both water-tight and secure. Such a system 10 may support a commercial-grade rack that may be directly mounted to the illustrated system 10. Commercial-grade racks may include industrial or wire shelving, storage cabinets, bin organizers, and other materials for holding agricultural, construction, carpentry, electrical, plumbing, painting, landscape, auto body repair, and other supplies. Similarly, the system 10 may also support a wide variety of recreational supply transportation.

Figure 2A:
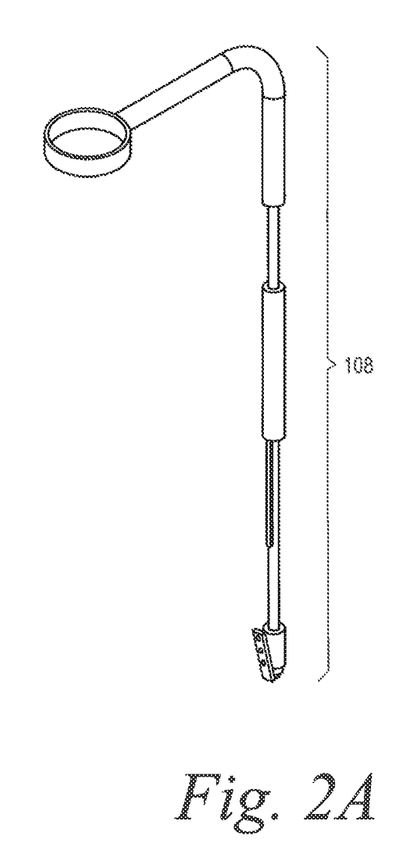
FIG. 2A illustrates a perspective view of a vertical railing of a system for a vehicle shell according to the embodiment of FIG. 1.
Figure 2B:
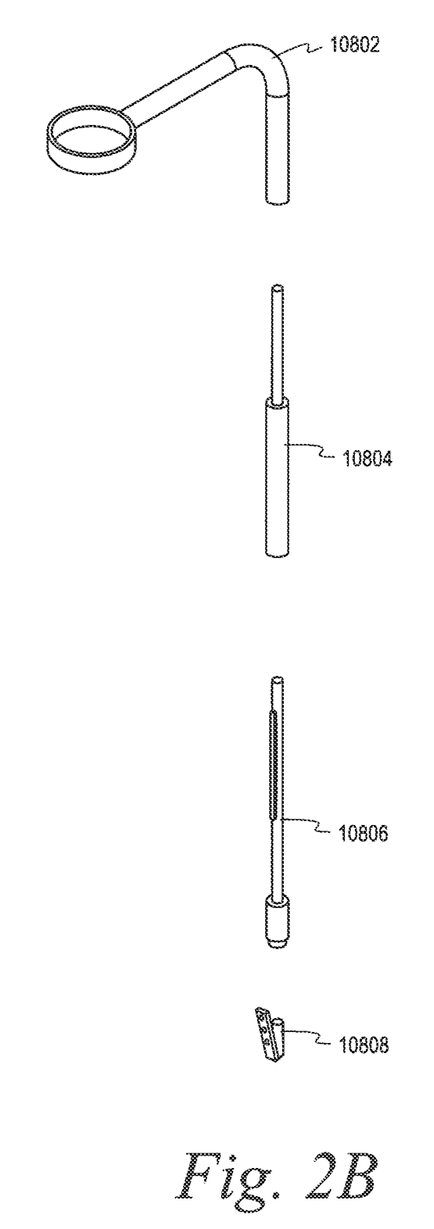
FIG. 2B illustrates an exploded view of a vertical railing of a system for a vehicle shell according to the embodiment of FIG. 1.

Referring to FIG. 2A, the railing 108 may be a vertical railing 108 may be comprised of multiple components. As depicted in FIG. 2B, in some implementations, the vertical railing 1008 may include a support 10802, a middle portion 10804, a bottom portion 10806, and a pin 10808. The support 10802 for the vertical railing 108 to connect to the insert 106 and the cross beam 104. The support may include a cylindrical end portion and an angled piece that connects to the insert 106. The middle portion 10804 or rod, may be used to support an attachment, such as maintaining the position of the hinge plate 110a. The bottom portion 10806 may be used to support attachments, such as maintaining the position of the sleeve 112. The bottom pin 10808 may be used to support attachments, such as maintaining the position of the hinge plate 110b, and secure the vertical railing 108 to the sidewall 102.

Figure 3A:
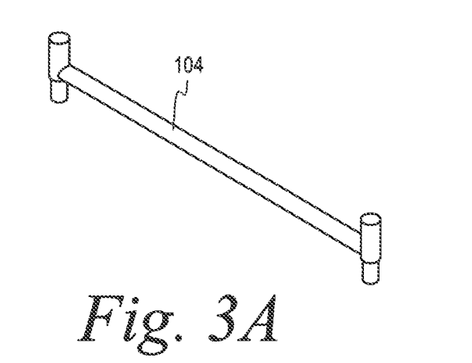
FIG. 3A illustrates a perspective view of a holster for rack attachments of a system for a vehicle shell according to the embodiment of FIG. 1.
Figure 3B:
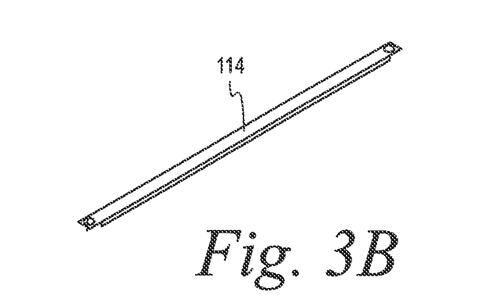
FIG. 3B illustrates a perspective view of a cross beam of a system for a vehicle shell according to the embodiment of FIG. 1.
Figure 3C:
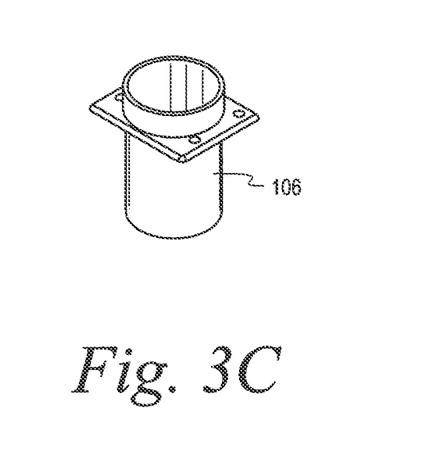
FIG. 3C illustrates a perspective view of a top plate of a system for a vehicle shell according to the embodiment of FIG. 1.

The system 10 may also be used to store and transport items that are connected and/or attached to the system 10 itself. Referring to FIGS. 3A-C, in some implementations, the horizontal railings 114 allow for the cylindrical inserts 106 to attach to the cross beams 104 by stabilizing the cylindrical insert 106. In some implementations, the cylindrical inserts 106 may be used to transport or store items.

Figure 4A:
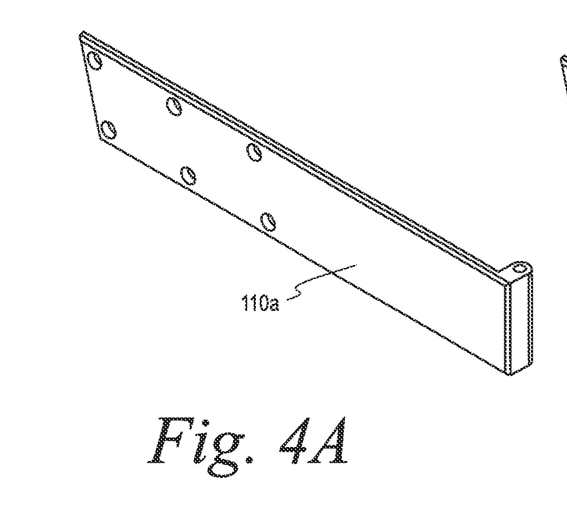
FIG. 4A illustrates an isometric view of an upper hinge of a hinge element of a system for a vehicle shell according to the embodiment of FIG. 1.
Figure 4B:
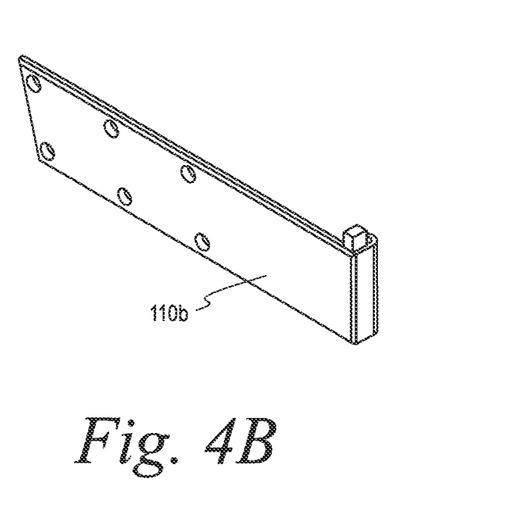
FIG. 4B illustrates a perspective view of a lower hinge of a hinge element of a system for a vehicle shell according to the embodiment of FIG. 1.
Figure 4C:
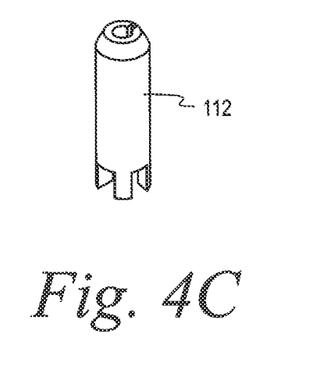
FIG. 4C illustrates a perspective view of a lower hinge of a hinge element of a system for a vehicle shell according to the embodiment of FIG. 1.

Referring to FIG. 4A-C, in some implementations, the hinge element may be made of multiple components. The hinge element may include the hinges plates 110a, 110b and the sleeve 112. As illustrated, the sleeve may include teeth or other indentations that fit over one of the hinge plates 110a or 110b once the back wall is rotated open far enough, so that a slot on the sleeve 112 fits over the plate 110a, holding open the back wall. To change the position of the back wall, the sleeve 112 may be pulled up/down off of the hinge plate 110a or 110 b, to allow the back wall to rotate closed or open around the railing 114.

Figure 5:
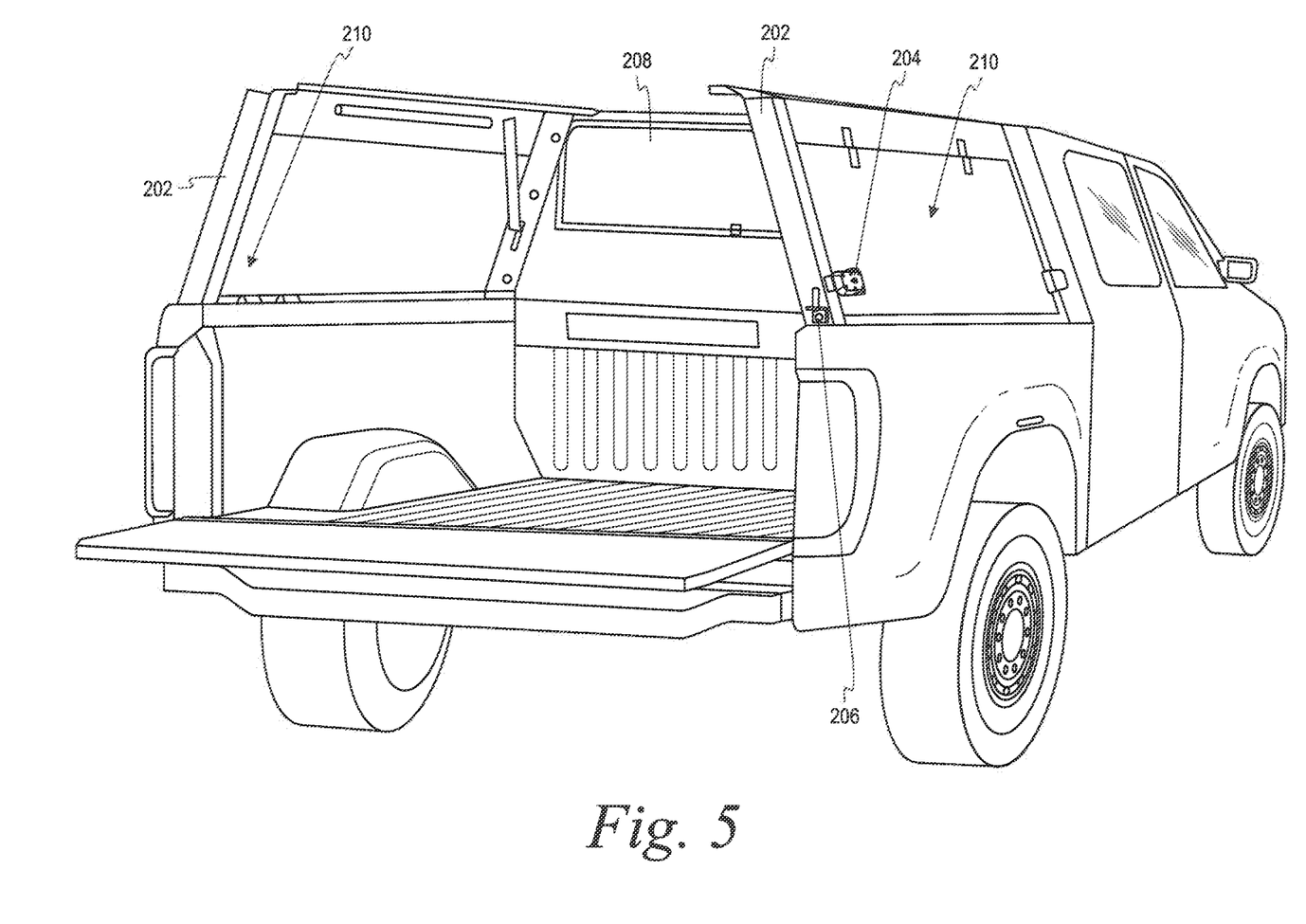
FIG. 5 illustrates a perspective view of a system for a vehicle shell with a retractable roof attached to a vehicle according an embodiment.

Referring to FIG. 5, in some implementations, the shell for a bed of a vehicle may include additional or alternative components, including but not limited to a sidewall 202, a lock 204, a door pin 206, a cover 208 (e.g. a convertible roof), and window 210. A cover 208 may include an accordion style cover that retracts and expands and has pins, knobs or rollers on each panel of the according design, that slide along the cover rails 108.

In some implementations, the system 10 includes components that allow for the shell to be completely watertight and/or weatherproofed when the cover 208 is attached and expanded to cover the top opening formed by the sidewalls and the back wall. In some implementations, the system 10 includes components that allow for the shell to be locked. In some implementations, the system 10 includes components that allow for the shell to maintain its rigidity at different temperatures.

The cover 208 may allow the user to easily access and load larger items into the bed of a vehicle without limitations in height. In some implementations, the convertible roof 208 may include an opening and closing mechanism similar to an accordion-style. For example, the cover 208 may include rectangular sheets or panels, that are connected together by a thin connector and may include a sheet catching mechanism on a back side of the cover 208, such that, in a cover 208 closed position, when the sheets are pushed from a front side of the cover 208, each sheet falls into the sheet catching mechanism, to move to a cover 208 opened position. In this implementation, the cover 208 is fully retracted and in a stored position. As illustrated, the cover 208 in a stored position allows for a user to access the full bed of the vehicle. Additionally, items with a height exceeding the height of the system may still be placed and transported in the vehicle.

Figure 6A:
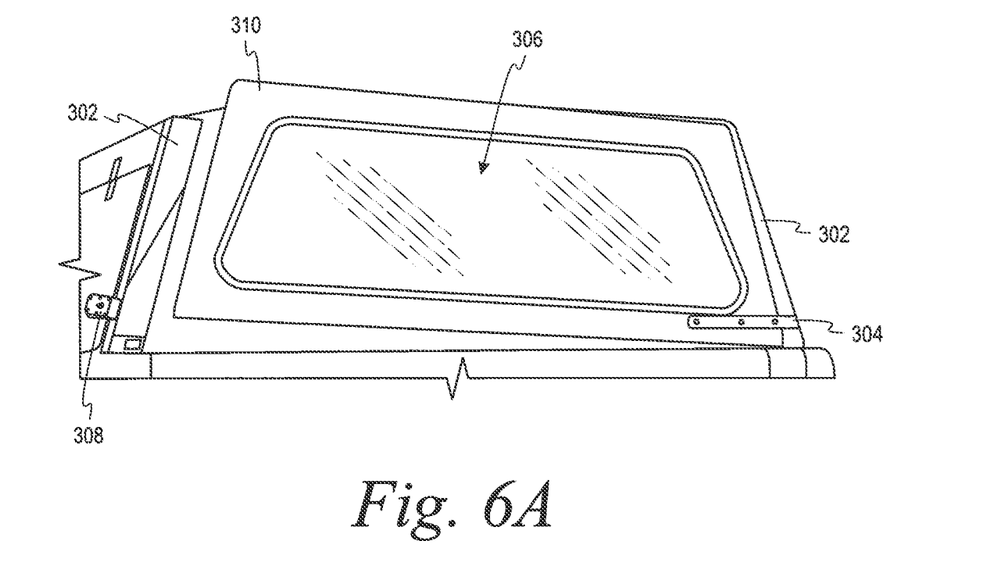
FIG. 6A illustrates a section view of a system for a vehicle shell with a retractable back door attached to a vehicle according an embodiment.
Figure 6B:
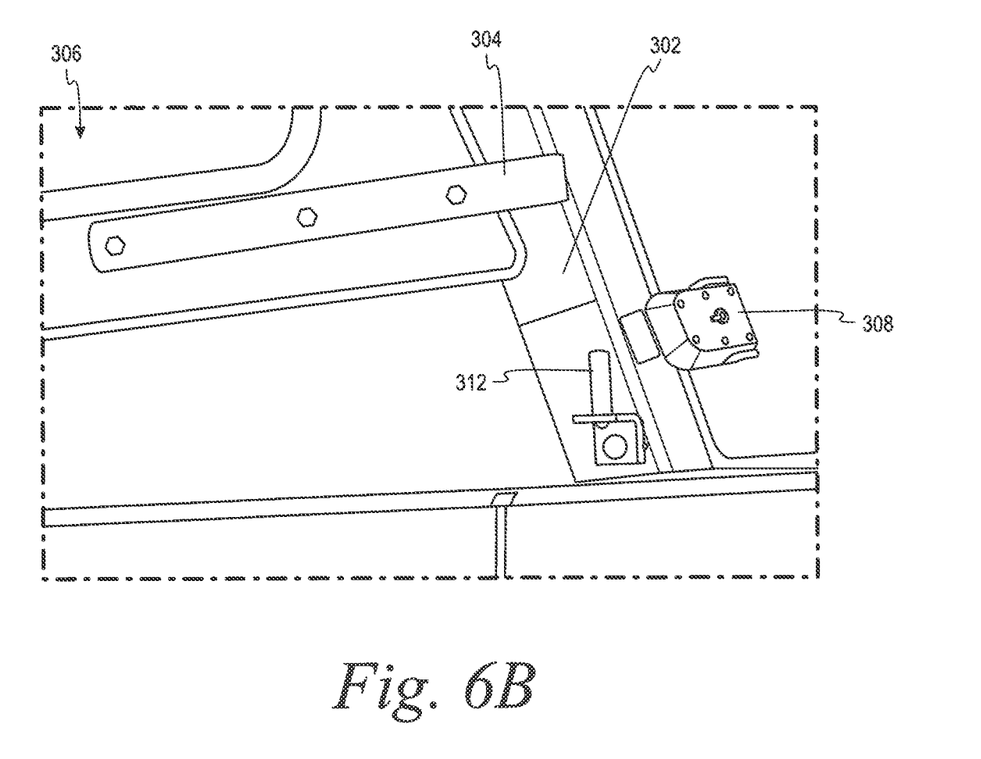
FIG. 6B illustrates a detail view of a system for a vehicle shell with a retracted back door according the embodiment of FIG. 6A.

In some implementations, the system may include the components illustrated in FIG. 6A. This may include sidewalls 302, a hinge plate 304, a window 306, a lock 308, a back wall 310, and a wall pin 312. Referring to FIG. 6B, in some implementations, a back wall 310 may be removable. The pin 312 may connect to the railing 114 as the railing may have an opening or hole at the bottom. In some examples, there may be a pin 312 on each of the four bottom corners of the sidewalls 102 so that four railings 114 may be installed.

Figure 7:
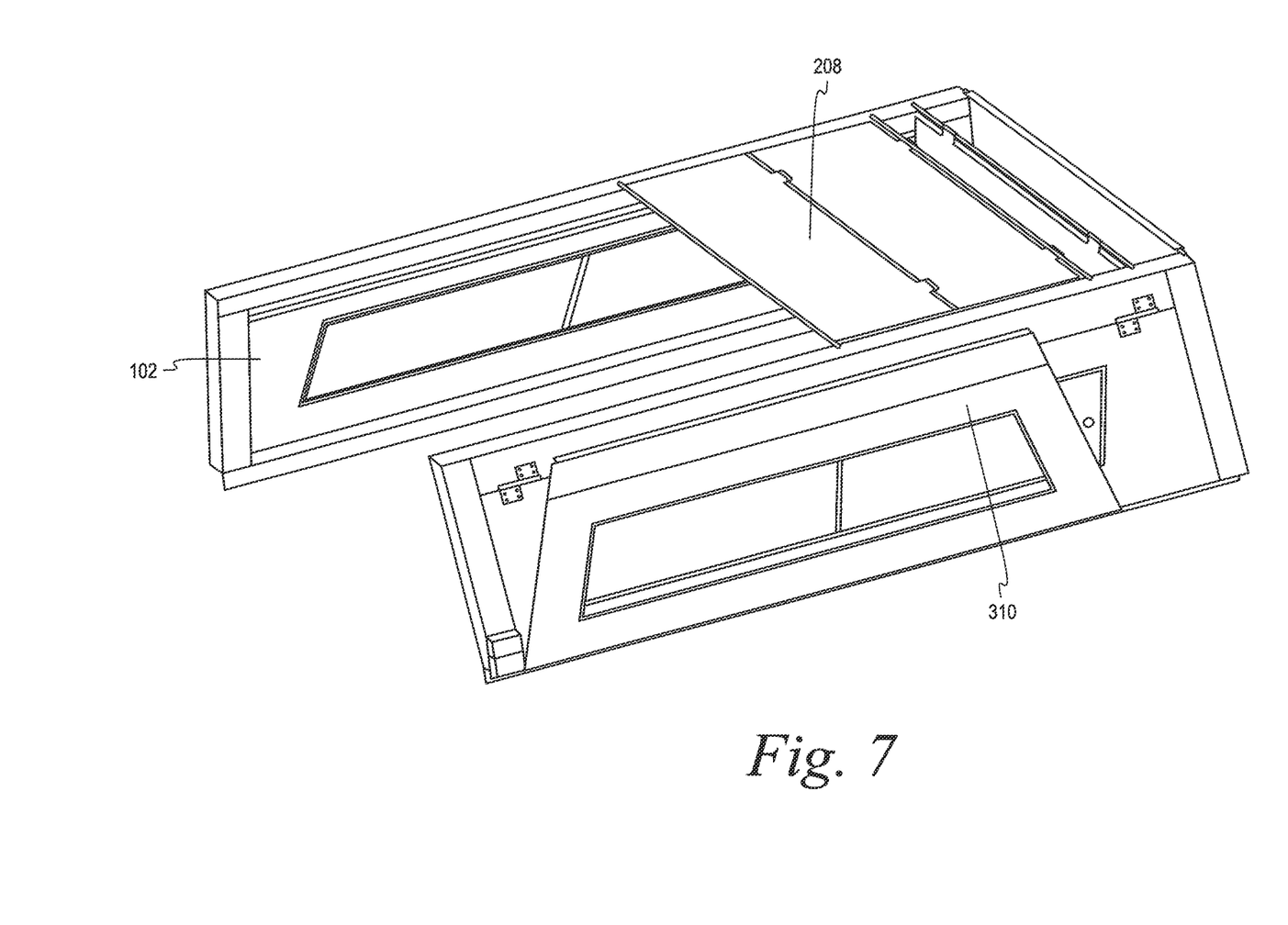
FIG. 7 illustrates a perspective view of a system for a vehicle shell with an accordion roof.

FIG. 7 illustrates another example of a system that includes sidewalls 102 and a cover 208, where the cover 208 is an accordion style roof that is partially expanded. The side walls 102 allow for the installation of the cover 208, which is used as a convertible/tonneau roof. As previously described, the side walls 102 (shown in FIG. 1) and cover railings 114 (shown in FIG. 1) may allow pegs, rollers, pins, or other mechanisms on the sides of the cover 208 to slide along the cover railings 114. As illustrated, the cover railings 114 include a channel to secure each end of the cover 208. The cover 208 includes a plurality of panels that make the cover 208 accordion style with the ability to retract, in a stored position, and extend, in a deployed position.

As illustrated, a portion of the plurality of panels of the cover 208 is in a stored position and another portion of the plurality of panels is in a deployed position. In other implementations, more or less panels of the cover 208 may be in the stored position or in the deployed position. A user may move one or more panels of the cover 208 from the deployed position to the stored position by applying a force, in a direction toward the location of the stored panels, sufficient to move the user's desired number of panels into the stored position. The stored panels may be located adjacent to a body of a vehicle where the system is installed. In this implementation, the vehicle is a truck and the system is installed on the bed of the truck. Thus, the stored panels are located near the back window of the truck and opposite of the opening end of the bed of the truck. Similarly, in order to move one or more panels of the cover 208, the user may apply an opposite force, in a direction away from the location of the stored panels, sufficient to move the user's desired number of panels into the stored position.

In this case, a back wall 310 is completely swung open and is along the sidewall 102. The cover 208 may be fully extended to cover the entire top opening of the system, and the back wall 310 may be swung back into place to securely (and in some examples using a watertight seal) enclose the bed of a pickup truck.

CONCLUSION

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. A system comprising:
   a pair of sidewalls, each including a top portion and two horizontal railings, configured to be coupled to parallel sides of a bed of a vehicle, each horizontal railing coupled to the top portion of the sidewalls;
   a pair of cross beams coupled perpendicularly to each top portion of the sidewalls configured to stabilize each sidewall;
   a plurality of cylindrical inserts, including a bottom, the bottom of each of the plurality of cylindrical inserts coupled to each of the horizontal railings of the pair of sidewalls, wherein each of the plurality of cylindrical inserts configured to attach one or more structures to each of the sidewalls; and
   a hinge element, including a sleeve, one or more hinge plates, and a vertical railing, the hinge element coupled to a back side of each of the sidewalls, the sleeve and the one or more hinge plates moveably configured to slide along the vertical railing, wherein a bottom side of the sleeve has one or more sets of protrusions matching one or more sets of protrusions on a top side of the one or more hinge plates.

2. The system of claim 1, wherein the assembly further comprises a retractable roof, including a plurality of panels, the plurality of panels coupled to each top portion of the sidewalls and movably coupled to each horizontal railing of the sidewalls via each horizontal railing, wherein the retractable roof is configured to retract each of the plurality of panels.

3. The system of claim 1, wherein the sleeve includes a retractable back wall movably coupled to at least one of the sidewalls.

4. The system of claim 3, wherein the sleeve includes a key insertable into the sleeve, the one or more sets of protrusions of the sleeve configured to restrict movement of the back wall.

5. The system of claim 3, wherein the hinge element is configured to provide a distance between the back wall and each of the sidewalls such that at an angle of 270 degrees, the back wall is about parallel with a side the pair of sidewalls.

6. The system of claim 1, wherein each of the sidewalls are configured to be a variable distance until coupled to the bed of a vehicle.

7. The system of claim 1, wherein each of the sidewalls are angled inward at a range of 15 to 20 degrees from a vertical axis.

8. The system of claim 1, wherein each of the plurality of cylindrical inserts configured to attach one or more items to each of the sidewalls may include one or more of: a hinging wall, a back door, a retractable roof, a rack system, a tool, an attachment, or a combination thereof.

9. The system of claim 1, wherein each of the sidewalls are coupled to one or more hinging windows.

10. The system of claim 9, wherein the hinging windows include a locking mechanism configured to secure the hinging windows.

11. A system comprising:
    a pair of sidewalls, each including a top portion and two horizontal railings, configured to be coupled to parallel sides of a bed of a vehicle, each horizontal railing coupled to the top portion of the sidewalls;
    at least one cross beam coupled perpendicularly to each top portion of the sidewalls configured to stabilize each sidewall;
    a plurality of cylindrical inserts coupled to each of the horizontal railings of the pair of sidewalls, wherein each of the plurality of cylindrical inserts is configured to attach one or more structures to each of the sidewalls;
    a hinge element, including a sleeve, one or more hinge plates, and a vertical railing, the hinge element coupled to a back side of each of the sidewalls, the sleeve and the one or more hinge plates moveably configured to slide along the vertical railing, wherein a bottom side of the sleeve has one or more sets of protrusions matching one or more sets of protrusions on a top side of the one or more hinge plates; and
    a back wall movably coupled to at least one of the sidewalls via the hinge element.

12. The system of claim 11, wherein the assembly further comprises a retractable roof, including a plurality of panels, the plurality of panels coupled to each top portion of the sidewalls and movably coupled to each horizontal railing of the sidewalls via each horizontal railing, wherein the retractable roof is configured to retract each of the plurality of panels.

13. The system of claim 11, wherein the sleeve includes a key insertable into the sleeve, the one or more sets of protrusions of the sleeve configured to restrict movement of the back wall.

14. The system of claim 11, wherein the hinge element is configured to provide a distance between the back wall and each of the sidewalls such that at an angle of 270 degrees, the back wall is about parallel with a side the pair of sidewalls.

15. The system of claim 11, wherein each of the sidewalls are configured to be a variable distance until coupled to the bed of a vehicle.

16. The system of claim 11, wherein each of the sidewalls are angled inward at a range of 15 to 20 degrees from a vertical axis.

17. The system of claim 11, wherein each of the plurality of cylindrical inserts configured to attach one or more items to each of the sidewalls may include one or more of: a hinging wall, a back door, a retractable roof, a rack system, a tool, an attachment, or a combination thereof.

18. The system of claim 11, wherein each of the sidewalls are coupled to one or more hinging windows.

19. The system of claim 18, wherein the hinging windows include a locking mechanism configured to secure the hinging windows.

20. A method comprising:
attaching a pair of sidewalls to a set of parallel sides of a bed of a vehicle, wherein the sidewalls each comprise a top portion and two horizontal railings, each horizontal railing coupled to the top portion of the sidewalls;
attaching at least one cross beam to each top portion of the sidewalls;
connecting a plurality of cylindrical inserts to the pair of sidewalls, wherein each of the plurality of cylindrical inserts are configured to attach one or more structures to each of the sidewalls;
connecting a hinge element to a back side of each of the sidewalls, the hinge element including a sleeve, one or more hinge plates, and a vertical railing, the sleeve and the one or more hinge plates moveably configured to slide along the vertical railing, wherein a bottom side of the sleeve has one or more sets of protrusions matching one or more sets of protrusions on a top side of the one or more hinge plates; and
attaching a back wall movably coupled to at least one of the sidewalls via the hinge element.

* * * * *